(12) United States Patent
Inami et al.

(10) Patent No.: US 7,516,351 B2
(45) Date of Patent: Apr. 7, 2009

(54) DISTRIBUTED TESTING APPARATUS AND HOST TESTING APPARATUS

(75) Inventors: Hisao Inami, Matsudo (JP); Yasuhiko Sasaki, Tsuchiura (JP); Hajime Katou, Chiyoda (JP); Ryo Miyake, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 992 days.

(21) Appl. No.: 10/901,965

(22) Filed: Jul. 30, 2004

(65) Prior Publication Data

US 2005/0060599 A1    Mar. 17, 2005

(30) Foreign Application Priority Data

Sep. 17, 2003  (JP) .............................. 2003-323868

(51) Int. Cl.
G06F 11/00 (2006.01)
(52) U.S. Cl. ........................................... 714/1; 702/20
(58) Field of Classification Search ................ 714/1; 702/20
See application file for complete search history.

(56) References Cited

U.S. PATENT DOCUMENTS

| | | | |
|---|---|---|---|
| 6,236,945 B1 * | 5/2001 | Simpson et al. ............... 702/20 |
| 2003/0113756 A1 * | 6/2003 | Mertz ............................. 435/6 |
| 2004/0024535 A1 * | 2/2004 | Lincoln et al. ................. 702/20 |
| 2005/0009078 A1 * | 1/2005 | Craford et al. ................. 435/6 |
| 2005/0010373 A1 * | 1/2005 | Varpela et al. ................. 702/20 |
| 2005/0214811 A1 * | 9/2005 | Margulies et al. .............. 435/6 |
| 2006/0116827 A1 * | 6/2006 | Webb et al. .................... 702/20 |
| 2006/0188922 A1 * | 8/2006 | Corson ........................... 435/6 |
| 2007/0027630 A1 * | 2/2007 | Sanchez ......................... 702/19 |
| 2007/0054277 A1 * | 3/2007 | Evans ............................. 435/6 |
| 2007/0190568 A1 * | 8/2007 | Hodge ........................... 435/6 |

FOREIGN PATENT DOCUMENTS

| | | |
|---|---|---|
| JP | 9-101998 | 4/1997 |
| JP | 9-504732 | 5/1997 |
| JP | 10-28678 | 2/1998 |
| WO | 95/006870 | 3/1995 |
| WO | 02/064826 | 8/2002 |

OTHER PUBLICATIONS

U.S. Appl. No. 10/464,674, filed Jun. 19, 2003.

* cited by examiner

*Primary Examiner*—Bryce P Bonzo
(74) *Attorney, Agent, or Firm*—Antonelli, Terry, Stout & Kraus, LLP.

(57) ABSTRACT

There is provided a group of testing apparatuses that realizes high-level testing and high quality medical treatment by conducting tests using apparatuses and facilities that are located in a distributed condition. A distributed testing apparatus is configured to be connectable to a network system to which a host testing apparatus is connected, wherein the distributed testing apparatus has a testing part that assays genetic information of a specimen, a transmission part that transmits test results information of the testing part and a specimen ID corresponding to the specimen to the host testing apparatus through the network, a receiver part that receives through the network assessment information from the host testing apparatus that corresponds to the transmitted test results information, and an output part that outputs the received information.

12 Claims, 12 Drawing Sheets

FIG. 2

| TREATMENT ADVICE | 02AXYZ |
|---|---|

| ITEM | DETAILS | TEST RESULTS | |
|---|---|---|---|
| NAME OF MEDICAL INSTITUTION | ○×INFIRMARY | ○○ REGION | ATTCGTA<u>A</u>TTCCCGTTATAATGCATCCGGATT |
| NAME OF EXAMINING DEPARTMENT | INTERNAL MEDICINE | | |
| NAME OF ATTENDING DOCTOR | ××××  | △△ REGION | CGTA<u>A</u>TTCCCGTTATAATGCATCCGGATTATT |
| SUBJECT ID | △△△△△△ | REFERENCE DATA | |
| TEST DATE | 2003/01/01 | ○○ REGION | ATTCGTA<u>C</u>TTCCCGTTATAATGCAACCGGATT |
| TEST ITEM | COLON CANCER SNPs | | |
| REAGENT NAME | primer ◇ | △△ REGION | CGTA<u>T</u>TTCCCGTTATAATGCATCCGGATTATT |

FIG. 3

| TREATMENT ADVICE | 02AXYZ | |
|---|---|---|
| ITEM | DETAILS | TEST RESULTS |
| NAME OF MEDICAL INSTITUTION | ○× LARGE HOSPITAL | ○○ REGION XX : MUTATION OF AC TO AA<br>△△ REGION YY : MUTATION OF AT TO AA |
| NAME OF EXAMINING DEPARTMENT | INTERNAL MEDICINE | REFERENCE DATA |
| NAME OF ATTENDING DOCTOR | ×××× | INCIDENCE OF COLON CANCER<br><br>○○ REGION      △△ REGION<br>AA TYPE / CC TYPE / AC TYPE    AA TYPE / TT TYPE / AT TYPE<br>NO ALCOHOL OR SMOKING: 62% / 30% / 8%    71% / 23% / 7%<br>ALCOHOL INTAKE: 71% / 26% / 3%    75% / 23% / 2%<br>SMOKING: 76% / 23% / 1%    75% / 24% / 1% |
| SUBJECT ID | △△△△△△ | |
| TEST ITEM | COLON CANCER SNPs | |
| ADVICE | · SNPs WERE DETERMINED IN BOTH ○○ REGION AND △△ REGION<br>· INCIDENCE OF COLON CANCER : 60 TO 75%<br>· PERMITTED ALCOHOL INTAKE AMOUNT : 0.5 OR LESS BOTTLE OF BEER / DAY<br>· PERMITTED SMOKING AMOUNT : 3 OR LESS CIGARETTES / DAY<br>· DIETARY DETAILS : TRY TO EAT ×× THAT IS HIGH IN VITAMIN △ AND FIBER<br>· REFERENCE : IT APPEARS THAT THE ANTI-CANCER AGENT ZZ MANUFACTURED BY ○△ COMPANY WILL PRODUCE STRONG SIDE AFFECTS IN THE SUBJECT | |

DISTRIBUTED TESTING APPARATUS AND HOST TESTING APPARATUS

INCORPORATION BY REFERENCE

The present application claims priority from Japanese application JP2003-323868 filed on Sep. 17, 2003, the content of which is hereby incorporated by reference into this application.

BACKGROUND OF THE INVENTION (1) Field of the Invention

The present invention relates to testing apparatuses.

(2) Description of the Related Art

Accompanying the approach of aging societies and the progress in deciphering genome information, the form of conducting medical tests is shifting from the conventional concentrated blanket testing at a test center to a distributed testing, so-called "POC (Point-of-Care) testing" that is at the end of medical scene such as at an infirmary 1 in a municipality or at the home of an individual who undergoes the test. JP-A-9-101998 discloses a home-care system that comprises a television-based interaction apparatus. With this system, information relating to blood pressure, pulse and the like is first gathered by an inspection machine installed at the home of the subject. The gathered information is then sent to a medical institution through a digital public line. A data processing apparatus in the medical institution then assesses the information in question, and if an abnormality exists therein, medical guidance is provided using a connection between a television-based interaction apparatus in the medical institution and the television-based interaction apparatus in the home of the subject. JP-A-10-28678 discloses a home-based health monitoring service that connects an inspection machine installed in the home of a subject with a monitoring apparatus located in a university hospital or monitoring center through a communication line, and carries out accurate monitoring of glycosuria assay data that is gathered by the inspection machine.

However, the above described known examples are testing systems that are limited to home-based treatment of diabetes and high blood pressure and the like, and are not adequate for use as systems that require advanced analysis.

For example, the above systems cannot be applied to POC testing within a hospital, typified by blood testing. The term "POC testing within a hospital" refers to the situation where testing such as blood testing, that has been conventionally conducted using a large-scale automatic testing apparatus (in a large hospital), is simply and conveniently conducted by means of a small-size testing apparatus.

Heretofore, tests requiring advanced analysis and the ensuing counseling and diagnosis process and the like based on the test results meant that it was necessary for a subject to visit a large-scale hospital or the like. Thus, the burden on the subject was significant.

The present invention relates to a testing apparatus that conducts testing using devices and facilities that are distributed among several locations to realize advanced testing and high quality treatment.

SUMMARY OF THE INVENTION

According to the present invention, there is provided testing apparatuses and the like that succeed in overcoming the above described problems.

An entire system composed of these testing apparatuses and servers is, for example, one configured as described below.

A distributed-type testing system having a distributed testing apparatus that is connected to a network and conducts a test of a specimen, and a host testing apparatus to which a test results of the above described distributed testing facility is communicated and which conducts assessment of the above described test results. The above described distributed testing apparatus has a testing part that assays genetic information of a specimen, a first transmission part that transmits to a second facility through a network test results information and a specimen ID corresponding to the above described specimen from the above described testing part, a first receiver part that receives from a network assessment information from the above described second facility that corresponds to the above described transmitted test results information, and an output part that outputs the above described received information. The above described host testing apparatus comprises a second receiver part that receives test results information from the above described distributed testing apparatus, a genetic information database, a comparing part that reads out from a genetic information database genetic information that corresponds to the above described test results information and compares the information, a second transmission part that transmits the above described comparison result through a network to the above described distributed testing apparatus, and a specimen database that stores the above described test results information that corresponds with the above described subject ID.

Further, the present invention provides the following:

(1) A distributed testing apparatus configured to be connectable to a network system, wherein the distributed testing apparatus has a testing part that assays genetic information of a specimen, a transmission part that transmits from the above described testing part to the above described host facility through a network test results information and a specimen ID corresponding to the above described specimen, a receiver part that receives through a network from the above described host testing apparatus assessment information that corresponds to the above described transmitted test results information, and an output part that outputs the above described received information.

For example, this network system communicates through a connection part with a host testing apparatus comprising a host receiver part that receives test results information, a genetic information database, a comparing part that reads out from a genetic information database genetic information that corresponds to the above described test results information and compares the information, a host transmission part that transmits the above described comparison result, and a specimen database that stores the above described test results information that corresponds to the above described subject ID.

(2) In the above (1), wherein the above described network is connected to a service provider.

For example, the above described distributed testing apparatus has: (a) an assay chip installation part into which is installed an assay chip having a reaction cell into which a specimen obtained from a living organism can be introduced, a reagent reservoir in which a reagent to be fed to the above described reaction cell is stored, and a reagent nozzle connecting the above described reaction cell and the above described reagent reservoir; (b) a feeding mechanism that supplies to the above described assay chip reagent reservoir, fluid that causes the above described reagent of the above described reagent reservoir to be discharged to the above described reagent nozzle; and (c) a detection part that detects a reaction in the above described reaction cell; wherein in correspondence with transmission of the above described test results information to the above described host testing apparatus, information regarding consumption of the above described assay chip is transmitted to the above described service provider. Further, the above described service provider has a memory part for storing the above described transmission information.

Also, in the above (1) or (2), the above described genetic information database is updated based on the above described test results information.

Further, in the above (1), for example, the above described test results comprises genetic information of specimens of a plurality of locations.

(3) The present invention further provides a distributed testing apparatus according to any of the above described forms, wherein a plurality of facilities are connected to the above described network, and the above described distributed testing apparatus transmits to the above described host testing apparatus institutional information including the above described test results information and the information processed by the above described host testing apparatus.

Thus, there is provided a distributed testing apparatus wherein test information from a medical facility that conducts a test using a testing apparatus is transmitted through a communication line to another medical facility that is designated by a subject.

(4) The present invention further provides a distributed testing apparatus according to any of the above described forms, wherein the receiver part receives assessment information from the above described host testing apparatus that corresponds with the above described transmitted test results information as well as test results information of the above described specimen that was stored in the above described specimen database.

Thus, since previously recorded information of a host testing apparatus is transmitted, even in a case where a host testing apparatus is connected with a plurality of distributed testing apparatuses, and a specimen was tested by a different distributed testing apparatus or host testing apparatus in the past, it is possible for a subject that provided a specimen and the related parties to select a consulting hospital or institution and gather the desired data.

(5) The present invention still further provides a distributed test server configured to be connectable to a network system to which is connected a host test server that comprises a host receiver part that receives test results information, a communicating part that communicates with a genetic information database, a comparing part reads out from a genetic information database genetic information corresponding to the above described test results information and compares the information, and a host transmission part that transmits the above described comparison result, wherein the above described distributed test server has a test information input part to which is input information from a testing part that assays genetic information of a specimen, a memory part that stores a specimen ID that corresponds with a specimen, a first communication part that communicates with a transmission part that transmits to the above described host facility through a network the above described ID and test results information from the above described test information input part, a receiver part that receives from a network assessment information from the above described host test apparatus that corresponds to the above described transmitted test results information, a recording part that records the above described received information, and a second communication part that communicates with an output part that outputs the above described received information.

(6) The present invention further provides the above described host test server having, for example, a specimen database that stores the above described test results information corresponding to the above described subject ID.

(7) The present invention further provides a host testing apparatus comprising a connection part that connects to a network system to which is connected a distributed testing apparatus comprising an assay chip installation part into which is installed an assay chip having a reaction cell into which a target specimen obtained from a living organism can be introduced, a testing part that assays genetic information of a specimen in the above described reaction cell, and a transmission part that transmits to the above described host facility via a network test results information from the above described testing part and a specimen ID that corresponds to the above described specimen, wherein the above described host testing apparatus comprises a host receiver part that receives test results information from the above described distributed testing apparatus, a connection part that connects to a genetic information database, a comparing part that reads out from a genetic information database genetic information corresponding to the above described test results information and compares the information, a host transmission part that transmits the above described comparison result through a network to the above described distributed testing apparatus, and a specimen database that stores the above described test results information that corresponds to the above described subject ID.

For example, the above described genetic information database is updated based on the above described test results information.

(8) The present invention still further provides a host testing apparatus according to the above described (7), wherein the above described test results comprises genetic information of specimens of a plurality of locations, and the apparatus compares a genetic sequence of a test results and a genetic sequence for an area of interest stored in the above described genetic information database. For example, at least a difference with respect to a mean value or a majority value is compared.

(9) The present invention further provides a host testing apparatus according to the above described (7) or (8), wherein the above described network is connected to a service provider, the above described host receiver part receives test results information, a specimen ID, test information and information concerning a consumed assay chip that is transmitted from the above described distributed testing apparatus, and the above described host transmission part transmits to a service provider the above described information received by the above described host testing apparatus, and wherein the host testing apparatus comprises a personal information control part that deletes at least ID information of a specimen during a period before the above described received information is transmitted to a service provider.

A service provider that provides consumable items for a testing apparatus receives through a communication line information regarding consumable items that were consumed in a test from a medical facility that uses a testing apparatus, whereby a stock of the consumable items can be promptly replenished.

Particularly, from the viewpoint of maintaining security it is preferable that information regarding consumable items that is determined on the basis of information of a database for handling information regarding consumable items received from a testing facility equipped with a distributed testing apparatus is transmitted to a service provider that provides the consumable items of a testing apparatus after deleting personal information therefrom.

(10) The present invention further provides a host testing apparatus according to any of the above described (7) to (9), wherein the above described host testing apparatus has an input part for entering a comment based on the above described comparison result, and the above described host transmission part transmits the above described comparison result and the above described comment to the above described distributed testing apparatus.

(11) The present invention further provides a host testing apparatus according to any of the above described (7) to (10), wherein, when the above described test results information received by the above described host receiver part includes destination information that has selected a destination for a result processed by the host testing apparatus, the host testing apparatus transmits the above described comparison result to the above described selected destination (for example, to another distributed testing apparatus that communicates with a network).

(12) The present invention further provides a host test server comprising a connection part that connects to a network system to which can communicate a distributed test server that comprises: an assay chip installation part into which is installed an assay chip having a reaction cell into which a specimen can be introduced; an input part that inputs test information from a testing apparatus comprising a testing part that assays genetic information of a specimen in the above described reaction cell; a first recording part that records the above described test information; and a second recording part that records a specimen ID that corresponds to the above described specimen; wherein the above described host test server comprises a host receiver part that receives test results information and a specimen ID that corresponds to the above described specimen from the above described distributed test server, a connection part that connects to a genetic information database, a comparing part that reads out from a genetic information database genetic information that corresponds with the above described test results information and compares the information, an input part for entering a comment corresponding to the above described comparison result, and a host transmission part that transmits the above described comparison result and the above described comment to the above described distributed test server.

Preferably, a host testing apparatus is located in a medical facility having a database such as a genetic sequence database that is connected through a communication line to a facility equipped with a plurality of distributed testing apparatuses that conducts tests using the testing apparatuses, wherein the host testing apparatus has a device that receives test information from the above described testing facility, and the host testing apparatus can transmit to the above described testing facility assessment information that was assessed on the basis of information of the above described database that corresponds with the above described received test information and can record the above described test information in a database.

When a small-sized distributed testing apparatus that can easily carry out the above procedure and conduct prompt analysis is disposed in apparatuses or facilities that are located in a distributed condition that connect to a network, such as an infirmary in a municipality or the like, the frequency of visits of a subject to a large hospital that may be a considerable distance from the subject can be reduced or eliminated completely, thereby significantly reducing the physical burden on the subject.

When the genetic information of an individual can be grasped by a blood test using POC testing, tailor-made treatment can be implemented that suppresses side affects of drugs by administering medicines that are adjusted in accordance with the genetic information of the subject. To achieve this, it is desirable not only to provide small-size testing apparatuses in infirmaries, but also to utilize a system that improves testing accuracy by including genomic information that is updated daily when judging a test results.

Preferably, a distributed testing system based on a small-size testing apparatus constructed in this manner is a system that can increase testing accuracy by allowing the test data of a subject to be communicated between hospitals, or can reduce the physical burden on a subject.

With respect to a database of the aforementioned host testing apparatus or host test server, in addition to a case where the apparatus or server itself has a recording part that records a database, a form may be employed in which the host testing apparatus or host test server comprises a connection apparatus that connects to a database stored in another information organization.

According to the present invention, there can be provided a testing apparatus that provides advanced testing and high quality treatment by conducting testing using facilities and apparatuses that are located in a distributed condition.

Other objects, features and advantages of the invention will become apparent from the following description of the embodiments of the invention taken in conjunction with the accompanying drawings.

BRIEF DESCRIPTION OF THE DRAWINGS

FIG. 2 is a view showing the format of a test results table;

FIG. 3 is a view showing the format of treatment advice;

PREFERRED EMBODIMENTS OF THE INVENTION

Examples of the present invention are described hereunder. However, the present invention is not limited to the contents disclosed in the following examples and corresponding drawings and the like, and the invention also includes modified forms of these examples through which the same effects can be obtained based on known techniques and the like.

Hereafter, for ease of description and understanding, each facility and apparatus is described using a general term (for example, "a hospital").

In Example 1 of the present invention, a case is described in which a subject goes to a local infirmary and a genetic sequence of the subject is assayed.

(POC Testing Service System)

Figure 1:
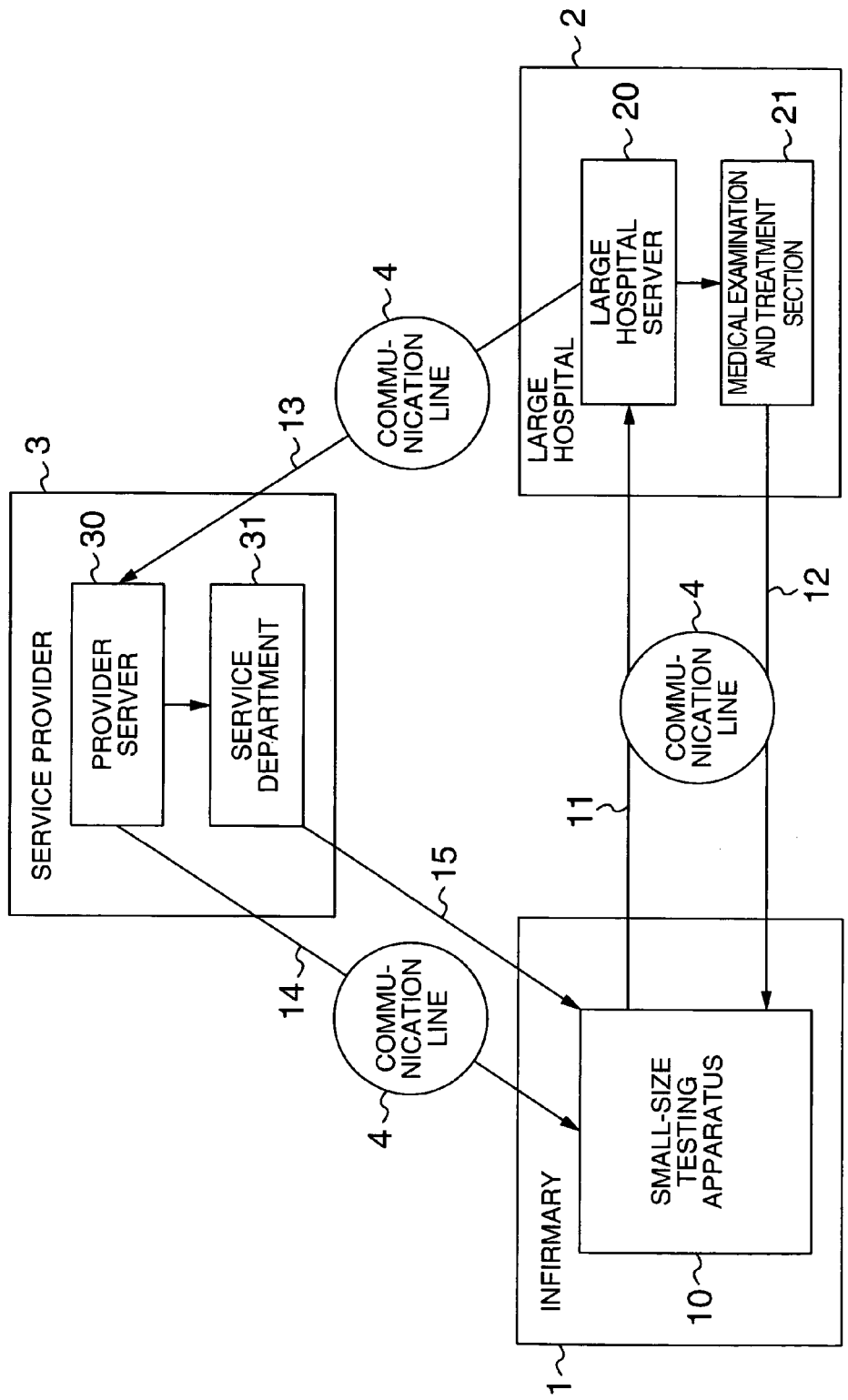
FIG. 1 is a schematic diagram of the overall testing system according to Example 1.

FIG. 1 is a view showing the overall configuration of a service system for POC testing using a small-size testing apparatus. In this example, the configuration is such that it is possible to connect through communication lines 4 an infirmary 1 that uses a small-size testing apparatus 10 comprising a disposable assay chip to simply and promptly conduct a test that is conventionally conducted in a large hospital 2, a large hospital 2 that has an anamnestic clinical database and a genetic database that is updated daily, and a service provider 3 that provides the small-size testing apparatus 10 or a disposable assay chip. The infirmary 1 that is equipped with a distributed testing apparatus or a distributed test server can communicate through the communication lines 4 with the large hospital 2 functioning as a so-called host testing apparatus or host test server and which communicates with a plurality of the infirmaries 1. The same applies for the service provider 3 that provides assay chips or the like.

Examples of the infirmary 1 include a private surgery or a clinic at a company or school that a does not possess a large-size testing apparatus. A physician of the infirmary 1 conducts a test of a subject using the small-size testing apparatus 10, and using an information transmission function in the small-size testing apparatus 10 transmits a test information 11 (name of medical institution, name of department conducting medical examination, name of attending doctor, ID of subject, test date, test item, reagent name, test results, consumable item information) to the large hospital 2. Herein, the term "test results" refers to a result of analysis of a genetic sequence (for example, in the case of specific symptoms such as those of cancer, a genetic sequence that is presumed to be associated with onset of cancer, or, for example, an SNP (single nucleotide polymorphism), which refers to a different polymorphism of only a single base in a base sequence. It is considered that several hundred thousand SNPs are present in the human genome that consists of three billion base pairs, and they are currently being discovered at a rate of several thousand per week).

Further, the term "consumable item" refers to a disposable assay chip in which a reagent that is required for a test is previously included.

The large hospital 2 may be a university hospital or the like that has an abundance of clinical data. The test information 11 is edited by a large hospital server 20 within the large hospital 2, to produce a test results table to which is attached data extracted from the large hospital server 20. An example of a test results table is shown in FIG. 2. The name of the medical institution where a subject underwent a test, as well as the name of the department conducting the medical examination and the name of the attending doctor may be shown by the actual name, or they may have a function whereby these are shown in the form of an ID such as a code number. The subject ID is acquired when a subject undergoes a test at the infirmary 1, and information such as the name or address of a subject is not listed. The relationship between a subject and a subject ID can be recorded in the infirmary 1. Accordingly, it is only possible for a physician of the infirmary 1 to identify a subject, and privacy can thus be protected even in the case of transmitting and receiving test data through a network. The table also shows the test date, test item and reagent name. With respect to a test item and reagent name, because these are unique to an assay chip they can be easily extracted from consumable item information. Further, the test results (in this example, a genetic sequence of a specific region) for a subject and reference data (a standard genetic sequence) are described on the right side of the test results table.

This test results table is forwarded from a large hospital server 20 to a medical examination and treatment section 21. A physician of the medical examination and treatment section 21 examines the test results table on the basis of an anamnestic clinical database, and prepares a treatment advice 12 to which is attached clinical database and a treatment comment and transmits this to the small-size testing apparatus 10 in the infirmary 1. An example of the treatment advice 12 is shown in FIG. 3. The name of the medical institution, the name of the department conducting the medical examination and the name of the attending doctor described thereon may be the actual name or may be a code number. The treatment advice also shows the subject ID, test item, and test results. Based on the test results, relevant clinical database is attached as reference data in the medical examination and treatment section 21. Preferably, the relevant clinical database contains data such as differences with respect to genetic information parameters or the incidence of disease with respect to lifestyle habits. The comments of a physician or specialist with respect to a test results of a subject are also entered. Alternatively, advice on dietary habits or comments concerning side effects that may be produced in a subject by a pharmaceutical agent associated with the case or the like may be included. This information can be used to good effect when prescribing medicine due to the influence of side effects.

This treatment advice is received by the infirmary 1, thus enabling the infirmary 1 to provide highly accurate treatment that is adjusted to suit the genetic constitution of a patient. The infirmary 1 pays an advice provision fee to the large hospital 2.

The large hospital server 20 and a provider server 30 within a service provider 3 are connected through the communication line 4, and a consumable item file 13 is transmitted to the provider server 30 from the large hospital server 20. The consumable item file 13 is a file in which information for updating a database is added to the consumption status of assay chips in the infirmary 1. For example, since the relation between a nucleotide sequence of a gene and a disease (an adult disease such as cancer or diabetes) becomes clearer as a database is built-up, by providing database information to the service provider 3 it is possible for the service provider 3 to improve the contents of a reagent (for example, in the case of a reagent for genetic analysis, the base sequence of a primer) contained in an assay chip, whereby the service provider 3 can provide an assay chip that conducts a more accurate assay. The service provider 3 pays an information provision fee for the information provided from the large hospital 2. When transmitting the consumable item file 13 from the large hospital server 20 to the provider server 30, the large hospital server 20 deletes personal information of the subject.

The provider server 30 at the service provider 3 is also connected to the small-size testing apparatus 10 through the communication line 4, and it is thus possible for the provider server 30 to also obtain consumable item information 14 of the small-size testing apparatus 10 without communicating with the large hospital 2. The consumable item information 14 that is received by the provider server 30 is promptly forwarded to a service department 31. The service department 31 prepares a reagent based on this information, and includes the reagent in an assay chip. The service department 31 then supplies an assay chip 15 containing a reagent to the infirmary 1 in a frozen or refrigerated condition. The assay chip is frozen or refrigerated because cooling the assay chip to a temperature below ordinary temperature inhibits deactivation of a reagent. Since testing is enabled by simply returning the assay chip 15 supplied to the infirmary 1 to ordinary temperature prior to a test, a test can be conducted without having to stock unrequited consumable items or without the need to spare labor to maintain the activity of a reagent.

(Configuration of Small-Size Testing Apparatus)

Figure 4:
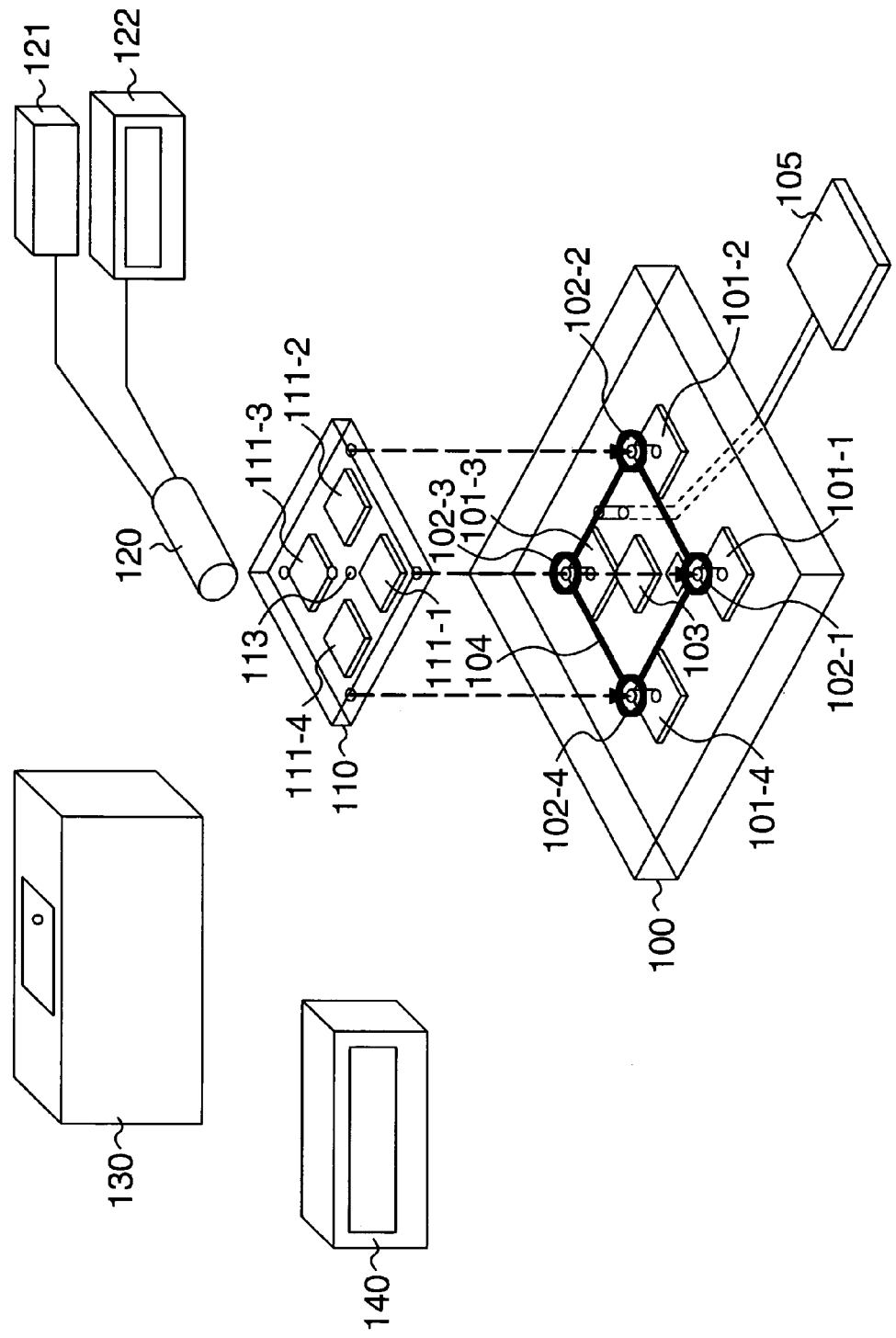
FIG. 4 is a perspective view showing an example of the configuration of components of a small-size testing apparatus 10.
Figure 5:
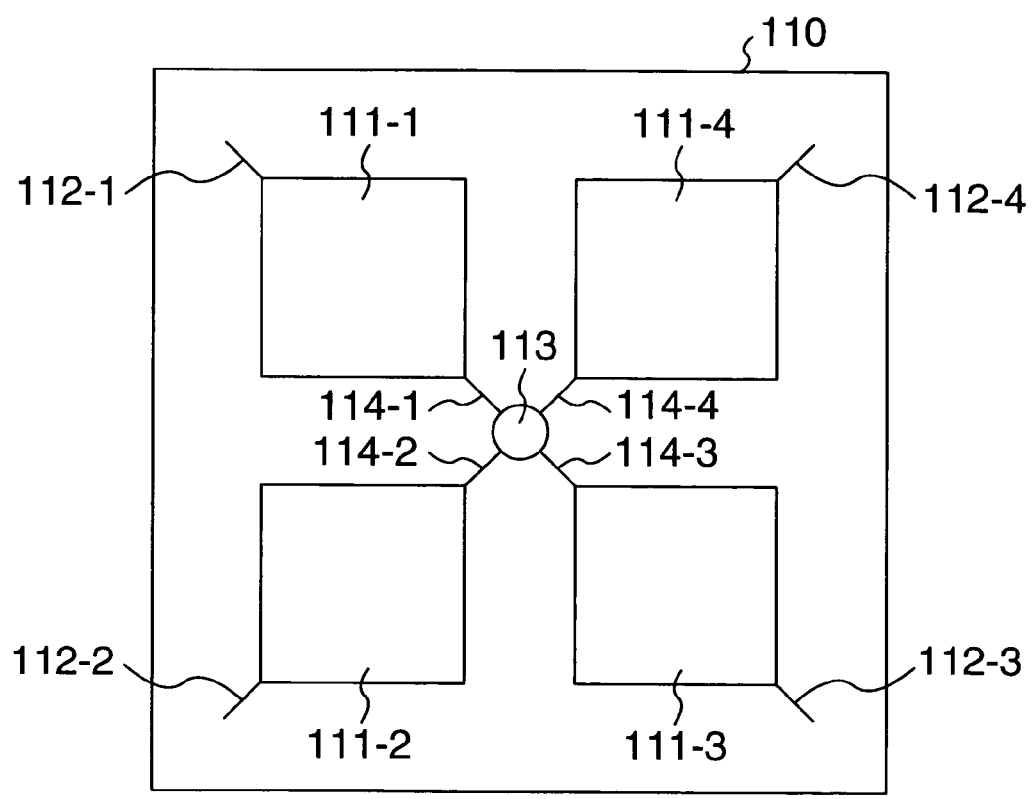
FIG. 5 is an enlarged view showing a configuration of an assay chip of a small-size testing apparatus 10.

The configuration of a small-size testing apparatus will be described hereunder using FIGS. 4 and 5. FIG. 4 is a schematic diagram of a testing apparatus, and FIG. 5 is a detail drawing of an assay chip.

An example of a testing apparatus is an apparatus having: (1) an assay chip installation part into which is installed an assay chip having a reaction cell into which a specimen obtained from a living organism can be introduced, a reagent reservoir in which a reagent to be fed to the above described reaction cell is stored, and a reagent nozzle connecting the above described reaction cell and the above described reagent reservoir; (2) a feeding mechanism that supplies to the above described assay chip reagent reservoir, fluid that causes the above described reagent of the above described reagent reservoir to be discharged to the above described reagent nozzle; (3) a detection part disposed facing the above described reaction cell that detects light generated in the above described reaction cell; and (4) a mechanism that transmits and receives test information.

An example of an assay chip is a chip having: (1) a substrate; (2) a reaction cell formed on the above described substrate into which a specimen obtained from a living organism can be introduced; (3) a reagent reservoir that can store a reagent to be supplied to the above described reaction cell; (4) a reagent nozzle that connects the above described reaction cell and the above described reagent reservoir and forms a flow channel that allows the above described reagent stored in the above described reagent reservoir to flow into the above described reaction cell; and (5) a fluid supply channel that is connected to the above described reagent reservoir and supplies to the above described reagent reservoir fluid that causes the above described reagent to flow from the above described reagent reservoir to the above described reagent nozzle.

The chip is equipped with a plurality of reagent reservoirs and reagent nozzles that connect a reagent reservoir and a reaction cell.

This testing apparatus is largely divided into the following five components: a substrate 100 on which an assay chip 110 is installed, an assay chip 110, a light-sensitive detector 120 for optically detecting a reaction in the assay chip 110, an assay chip incineration device 130, and an information transceiver 140.

The substrate 100 is composed of four pumps 101-i (i=1, 2, 3, 4) that feed a trace amount of a fluid (in this example, the volume of a fluid fed at one time is 0.1 µL), four substrate flow channels 102-i (i=1, 2, 3, 4) through which fluid that is output from a pump flows, a temperature control device 103 for optimizing the temperature of the assay chip 110 that is formed in a region on which a reaction cell 113 of the assay chip 110 is disposed, and an attachment groove 104 for attaching the assay chip 110. In this example, in order to handle four kinds of reagents (dATP, dTTP, dGTP, and dCTP) corresponding to four kinds of basees (A, T, G, and C), the number of the pumps 101-i and the substrate flow channels 102-i is four, however the respective number for each can be altered in accordance with a purpose of use. When using a Peltier device for the temperature control device 103, heating and cooling operations for the assay chip 110 can be simply conducted by changing only the direction of the impressed current. The form of the pump 101-i is not particularly limited, and a syringe pump or diaphragm pump can be used.

The assay chip 110 that is placed on the substrate 100 is previously inserted with a trace amount of reagent (dATP, dTTP, dGTP, and dCTP) that is sufficient for only one test, and the chip is used as a disposable chip that can be replaced for each specimen and incinerated after use. Thus, it is possible to simply and conveniently conduct highly accurate tests using reagents. That is, it is possible to save a tester the time and trouble required for preparing and inserting a reagent, and in addition to reducing the time required for preparation, contamination can also be prevented. The assay chip 110 comprises four reagent tanks 111-i that store four kinds of reagent, respectively, and four assay chip flow channels 112-i (i=1, 2, 3, 4) that communicate fluid fed from the flow channels of the substrate 100 to each of the reagent tanks 111-i. The assay chip 110 is provided with a region connected to the substrate flow channels 102-i of the substrate, and is composed of a reaction cell 113 in which a DNA sample of a subject and a reagent react, and four dNTP nozzles 114-i (i=1, 2, 3, 4) that interlink the reaction cell 113 and the four reagent tanks 111-i. As stated in the foregoing, the number of the assay chip flow channels 112-i, the reagent tanks 111-i, the dNTP nozzles 114-i and the reaction cell 113 can be modified according to a purpose of use.

As a material of the disposable assay chip 110, in contrast to the use of glass that entails a high processing cost, a material offering excellent disposal properties is preferred. For example, a substrate may employ an organic material as a principal component. The material is preferably a resin. Although the kind of a resin is not particularly limited, in this example polydimethylsiloxane (PDMS, manufactured by Dow Corning Asia, product name: Sylgard 184) that has the following excellent properties was used:

Excellent biocompatibility (standard silicone rubber is physiologically inactive)

Allows molding at submicron precision (since it has abundant fluidity and a low viscosity prior to curing, it permeates well to minute parts of a complex shape)

Low cost (less expensive than Pyrex glass that is used as a material for micro devices)

Easily disposable through incineration.

The assay chip 110 is placed on the substrate 100 to immobilize the substrate 100. The assay chip flow channels 112-i are then connected to the substrate flow channels 102-i. Specifically, by evacuating the attachment groove 104 of the substrate 100 using an evacuator 105, the assay chip 110 can be attached to the substrate 100. By performing a vacuum chuck in this manner, the substrate flow channels 102-i and the assay chip flow channels 112-i are securely connected, and in addition to preventing leakage of a fluid, this enables easy detachment of the assay chip 110 from the substrate 100.

The light-sensitive detector 120 is disposed such that a receiving surface of the light-sensitive detector 120 is facing the reaction cell 113 (for example, it is disposed such that it lies over the reaction cell 113). As the light-sensitive detector 120, a CCD camera, a photomultiplier, a photodiode or the like can be used, and a photodiode is preferable as it allows miniaturization of the apparatus.

The form of the chip incineration device 130 is not particularly limited, and a small-size electric furnace or the like that is capable of raising the temperature to approximately 1000 to 1200° C. may be used. The material of the assay chip 110 according to this example is polydimethylsiloxane. Since polydimethylsiloxane does not generate harmful dioxins or hydrogen sulfide at the time of incineration, it is not necessary to increase the temperature to the vicinity of 1500° C. as a measure to counter dioxins, and desulfurization equipment is also unnecessary. To allow further miniaturization of the testing apparatus, it is possible for the service provider 3 to collect used assay chips to enable the chip incineration device 130 to be omitted from the configuration.

Although in this example a nucleotide sequence of a gene is taken as the object of testing, it is also possible to test for a concentration of a protein in blood or the presence of an infectious disease by an antigen-antibody reaction, or the presence of an allergic reaction.

For example, blood of a subject can be filled into the reaction cell of an assay chip and a reagent (for example, for diagnosis of hepatitis type B virus, anti-hepatitis B surface antigen is used; for diagnosis of hepatitis type C virus, anti-hepatitis C virus antibody is used) from a reagent tank is then introduced into the reaction cell, whereby the virus itself (antigen) contained in the blood reacts with the antibody and agglutinates. By detecting the agglutination reaction using a light-sensitive detector, the presence or absence of an infectious disease in the subject can be assayed.

Further, by introducing serum into a reaction cell and conducting calorimetric analysis at the time of introduction of, for example, a reagent for hemanalysis as disclosed in National Publication of International Patent Application No. 1997-504732 into the reaction cell from a reagent tank using an absorptiometer, it is possible to assay the concentration of a protein or enzyme or the like in blood.

Thus, by using a common testing apparatus and preparing only the assay chip 110 that contains a reagent that is in accordance with an object to be tested, it is possible to perform a variety of tests simply and quickly. A compact and portable testing apparatus can be provided in which the assay chip 110 is placed on the substrate 100 and an easy-to-use light-sensitive detector 120 is combined therewith. By previously inserting a reagent of a volume sufficient for only one test into the disposable assay chip 110, a highly accurate test that uses a reagent can be conducted simply and easily, enabling the construction of a favorable environment for POC testing.

(Large Hospital Server)

Figure 6:
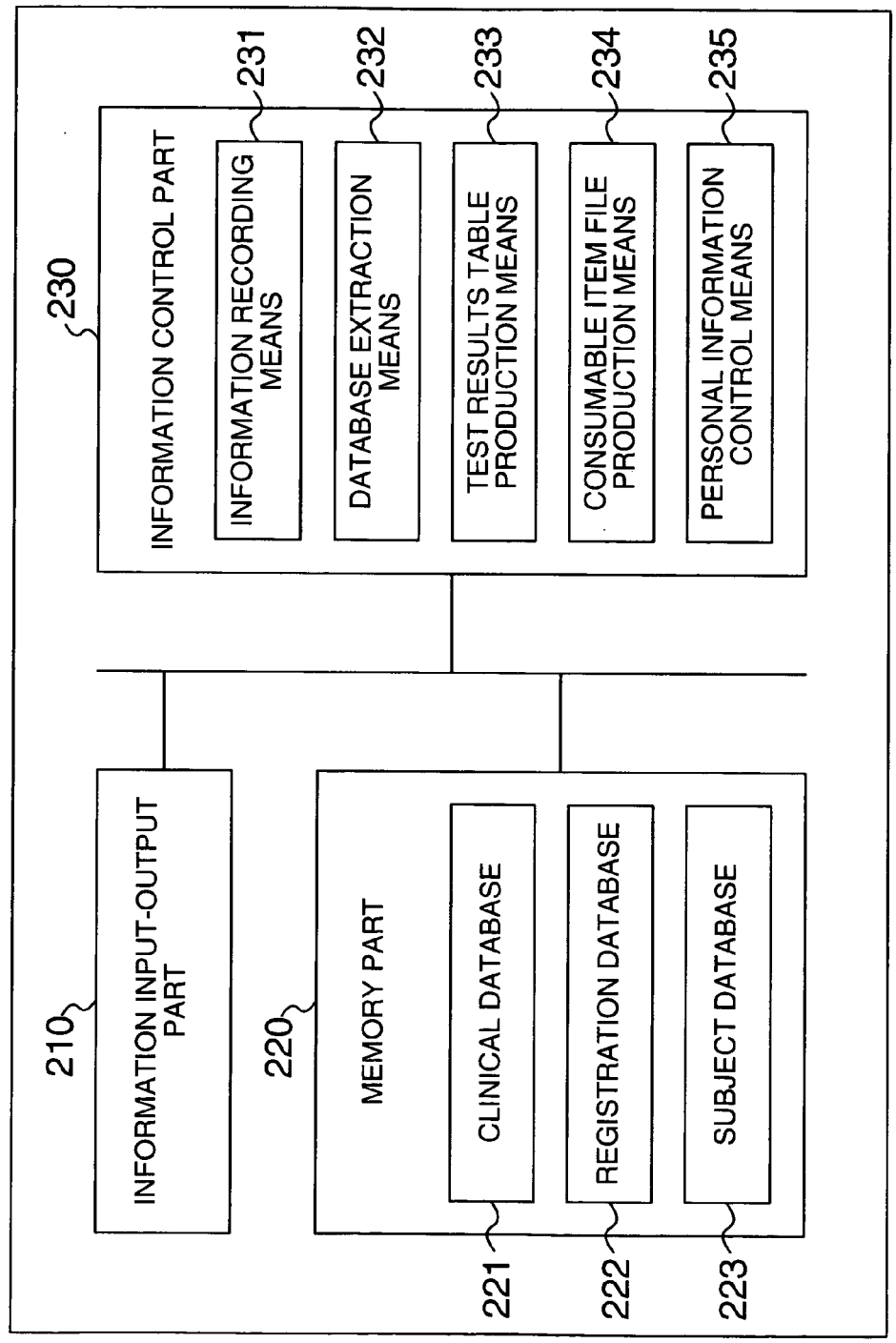
FIG. 6 is a block diagram showing a configuration of a large hospital 2 server of a large hospital 2.

The configuration of a large hospital server 20 that is disposed within the large hospital 2 is shown in FIG. 6. The large hospital server 20 is a server for recording and editing test information transmitted from the infirmary 1, and for transmitting the edited information to a medical examination and treatment section 21 in the large hospital 2 as well as a service provider 3. As shown in FIG. 6, the server of the large hospital 2 comprises an information input-output part 210, a memory part 220, an information control part 230 and the like that are connected by paths.

In the information input-output part 210, a monitor, a keyboard, a mouse and the like are connected through an I/O apparatus.

The memory part 220 is composed of a hard disk or the like and comprises a clinical database 221, a registration database 222, and a subject database 223. In the clinical database 221, anamnestic clinical database is stored. In the registration database 222, data that can be renewed by updating is stored. Examples of this data include sequence information of a decoded gene or the correlation between a gene and a disease, or information about the prevalence of influenza or pollen allergy or the like. For example, preferably genetic information corresponding to each test item is stored therein, and the database contains information that shows a relationship with the incidence of a disease or the like in a case where there is a difference with a mean value or a majority value or the like of a genetic sequence of a specific location in the parameter data. In the subject database 223, personal information (subject ID, name of hospital where test was conducted, test date, test item, and the like) of a subject that underwent a test in the infirmary 1 is stored. Thus, if the symptoms of the subject deteriorate and the subject has to visit the large hospital 2, it is possible for the large hospital 2 to quickly deal with the situation, as the required personal information is already available.

The information control part 230 is composed of a CPU (Central Processing Unit) and a RAM (Random Access Memory) and the like, and comprises an information recording means 231, a database extraction means 232, a test results table production means 233, a means 234 for producing a consumable item file 13, and a personal information control means 235. The information recording means 231 is means for recording test information transmitted from the small-size testing apparatus 10 of the infirmary 1 in each database of the memory part 220. The database extraction means 232 is means for extracting data in order to add data from a database to a test results of a subject or consumable item information. More specifically, when a subject undergoes a genetic test, in order to compare the correlation between the genetic sequence of the subject and a disease using a gene database, genetic data of a required region is extracted from the above described registration database 221.

The test results table production means 233 is means for creating a file in which data extracted from the above described database is added to test information of a subject, such that a physician of the medical examination and treatment section 21 can quickly examine a test results. FIG. 2 shows one example of a test results table produced thereby. Thus, when transmitted data of S32 is received, it can be incorporated by the information input-output part 210. The name of the medical institution where a subject was tested as well as the name of the department conducting the test and the name of the attending doctor may be the actual name or may take the form of a code number. A subject ID is acquired when the subject undergoes a test at the infirmary 1, and information such as the name or address of a subject is not listed in the test results table. The table also shows the test date, test item, and reagent name. With respect to a test item and reagent name, because these are unique to an assay chip, they can be easily extracted from the consumable item information. Further, the test results (in this example, genetic sequence of a particular region) for a subject and reference data (the standard genetic sequence) are listed on the right side of the test results table.

The consumable item file production means 234 is means for producing the consumable item file 13 that contains consumable item information (consumption status of an assay chip) in addition to information for updating a database, and for transmitting the consumable item file 13 to the provider server 30.

The personal information control means 235 is means for deleting personal information of a subject when transmitting the consumable item file 13 to the provider server 30 from the server of the large hospital 2.

Thus, a system can be provided that ensures security by comprising means for inputting and outputting information, a database for storing data such as clinical genetic sequence data, an information recording means for recording test information from a testing apparatus in a database, means that extracts from a database information corresponding to test information or consumable item information, means that compiles in a table consumable item information or test information to which is added the above described extracted data, and a personal information control means that deletes personal information of a subject prior to transmitting consumable item information to a provider server.

(Provider Server)

Figure 7:
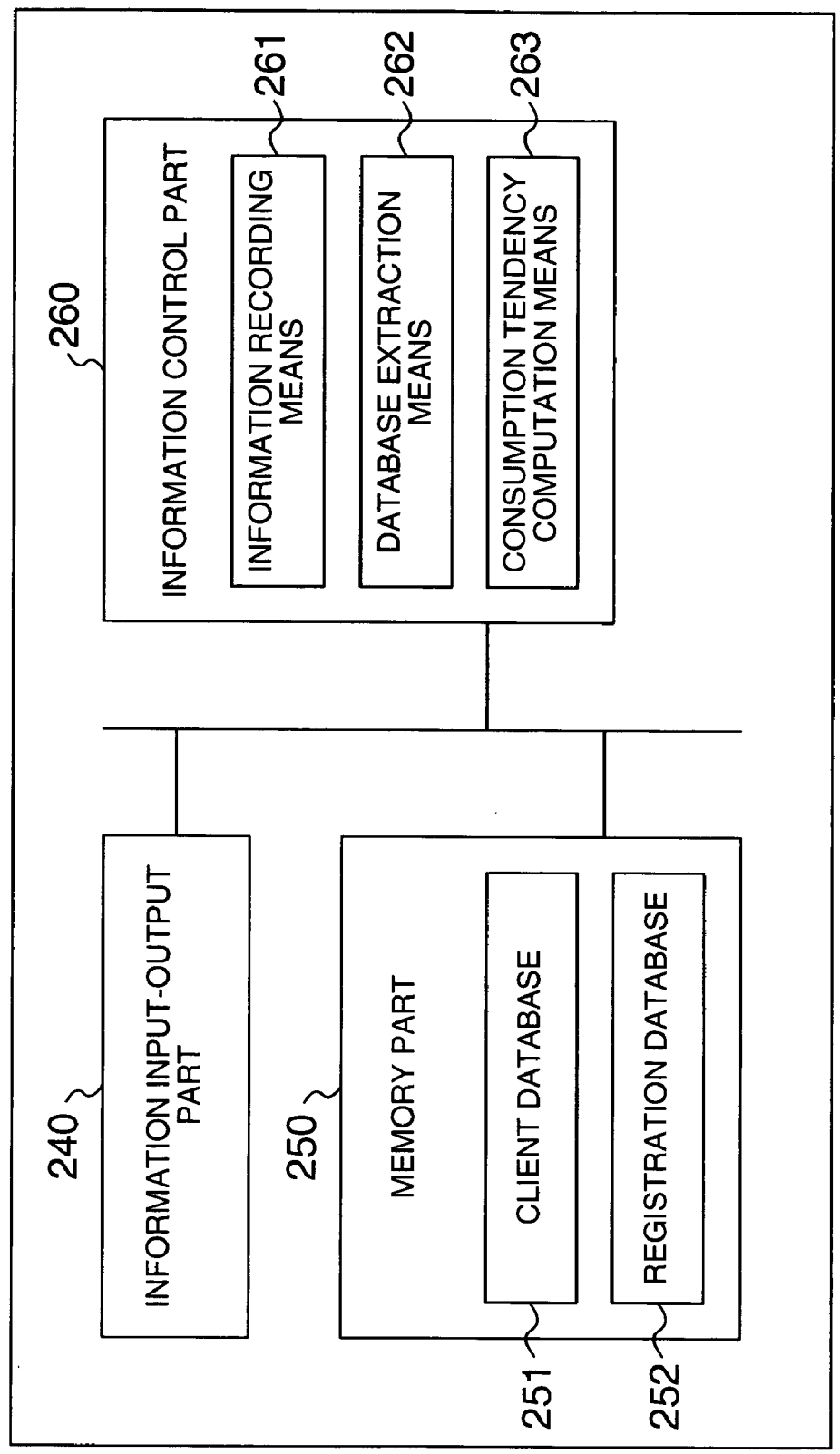
FIG. 7 is a block diagram showing a configuration of a provider server 30 of a service provider 3.

FIG. 7 shows the configuration of the provider server 30 located in the service provider 3. The provider server 30 records and edits consumable item information that was transmitted from the infirmary 1 or the large hospital 2, and transmits the edited information to the service department 31 within the service provider 3. As shown in FIG. 7, the provider server 30 is composed of an information input-output part 240, a memory part 250, an information control part 260 and the like which are connected by paths.

With respect to the information input-output part 240, the components thereof are the same as those of the above described server of the large hospital 2.

The memory part 250 is composed of a hard disk or the like and comprises a client database 251 and a registration database 252. In the client database 251, information regarding a user (in this example, the infirmary 1) of the small-size testing apparatus 10 or an assay chip or the usage status of a consumable item or the like is stored. In the registration database 252, data that can be renewed by updating is stored. Examples of such data include sequence information of a gene or the correlation between a gene and a disease provided by the large hospital 2 or information about prevalent diseases and regions where the diseases are prevalent and the like.

The information control part 260 is composed of a CPU and RAM and the like, and comprises an information recording means 261, a database extraction means 262, and a consumption tendency computation means 263. The information recording means 261 is means for recording consumable item information transmitted from the small-size testing apparatus 10 or the server of the large hospital 2 in each database of the memory part 250. The database extraction means 262 is means for extracting client information or updated medical treatment data from the above described databases. The consumption tendency computation means 263 is means for optimizing a line for production and formulation of a reagent that is included in an assay chip by producing data concerning seasonal lags and regional differences for prevalent diseases such as influenza and pollen allergies based on the above described databases. Thereby, the unnecessary stocking of assay chips is avoided and a form of testing can be provided that conforms to disease epidemics.

Thus, a server of a service provider can provide a service that quickly responds to the state of consumption of consumable items such as assay chips by comprising means for inputting and outputting information, a database for storing client data or updated data for epidemic diseases such as influenza or pollen allergy, means for recording in the above described databases consumable item information that was transmitted from a subject or medical facility through a communication line, means that extracts from a database client data or updated medical data, and a consumption tendency computation means that optimizes a line for production and formulation of a reagent that is included in an assay chip by producing data concerning seasonal lags and regional differences for prevalent diseases on the basis of the above described databases.

(Flow of POC Testing)

Figure 8:
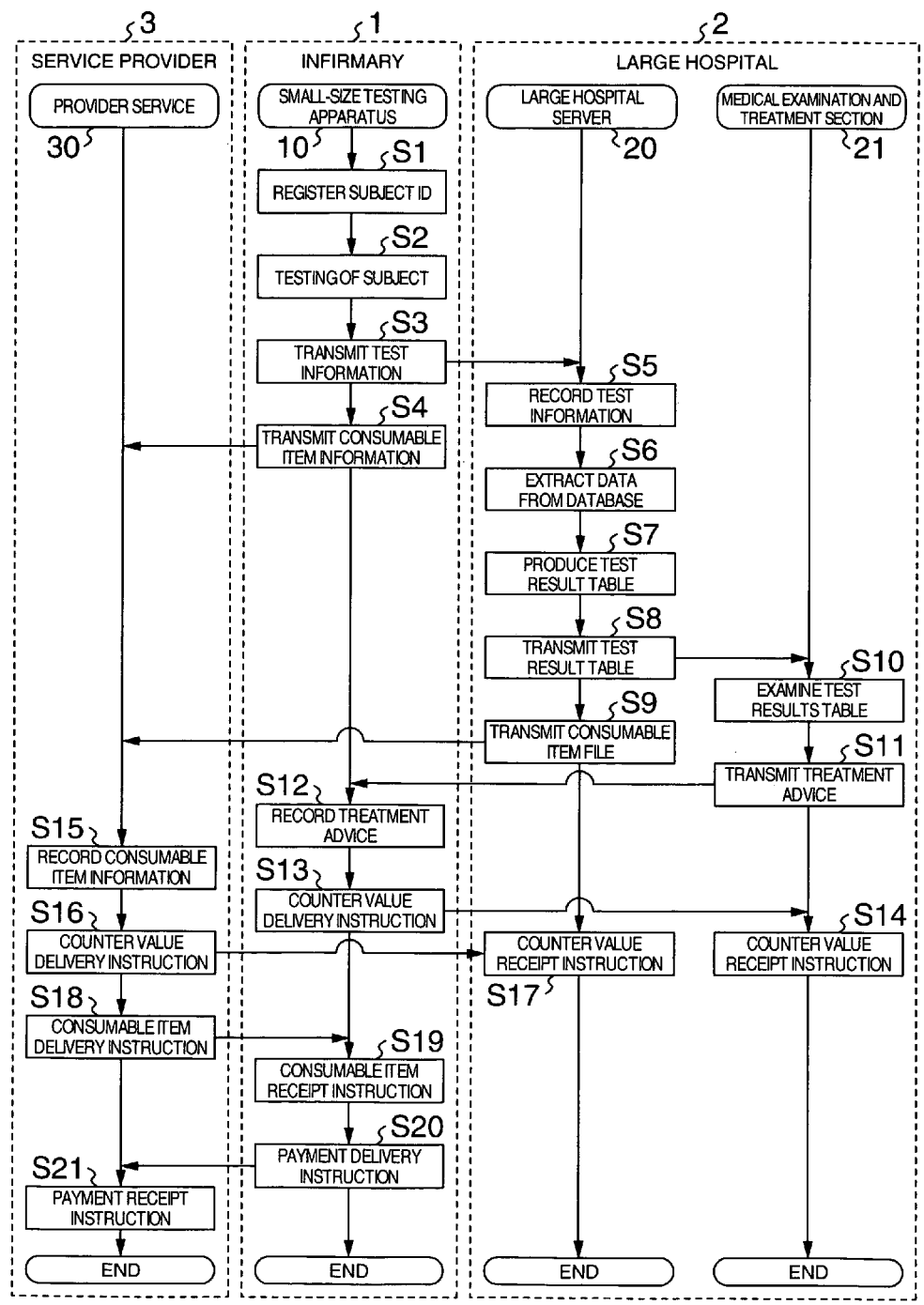
FIG. 8 is a flowchart showing the flow of a testing system according to Example 1.

FIG. 8 shows the flow of POC testing when a subject goes to a local infirmary 1 to undergo in the infirmary 1 a genetic test or the like that has conventionally been conducted in a large hospital 2. Herein, since the transmission and receipt of information is conducted among the infirmary 1, the large hospital 2 and the service provider 3, it is assumed that the three parties have entered into a service agreement prior to the start of operations.

First, the ID of the subject is registered in the small-size testing apparatus 10 in the infirmary 1 (S1). Personal information such as the name and address of the subject described in an insurance card or the like is not registered. Next, the subject undergoes a test for about 15 to 30 minutes using the small-size testing apparatus 10 (S2), and test information (test results, subject ID, consumable item information) is transmitted to the large hospital server 20 of the large hospital 2 (S3). When consumable item information is not included in the test information, the consumable item information is transmitted to the provider server 30 of the service provider 3 (S4).

Test information transmitted from the small-size testing apparatus 10 of the infirmary 1 is received by a server of the large hospital 2 through a communication line 4, and recorded in a database of the memory part 220 by the information recording means 231 of the information control part 230 (S5). Next, updated data of a registration database is extracted by the database extraction means 232 (S6), and a test results table in which updated data of the registration database is added to a test results of the subject is produced by the test results table production means 233 (S7). The test results table is then transmitted to the medical examination and treatment section 21 (S8). Also, a consumable item file 13 in which updated information of the registration database 222 is added to consumable item information is produced by the consumable item file production means 234, and the consumable item file 13 is transmitted to the provider server 30 of the service provider 3 (S9).

In the medical examination and treatment section 21, the test results table transmitted from the large hospital server 20 is examined (S10), and treatment advice is then transmitted to the small-size testing apparatus 10 (S11).

In the infirmary 1, the treatment advice received by the small-size testing apparatus 10 is recorded (S12), and used in treatment of the subject. The small-size testing apparatus 10 emits a signal indicating that value with respect to the treatment advice provided will be delivered to the large hospital 2 (S13). When the medical examination and treatment section 21 of the large hospital 2 receives the value it emits a signal (S14).

In the service provider 3, consumable item information that was transmitted from the small-size testing apparatus 10 or the server of the large hospital 2 is recorded in a database of the memory part 250 by the information recording means 261 of the information control part 260 (S15). Next, a signal is emitted indicating that value with respect to the consumable item file 13 that was transmitted from the large hospital server 20 will be sent to the large hospital 2 (S16). When the value is received, the large hospital server 20 of the large hospital 2 emits a signal (S17). In the service provider 3, a signal is then emitted indicating that a consumable item will be sent to the infirmary 1 (S18). When the consumable item is received, the small-size testing apparatus 10 of the infirmary 1 emits a signal (S19). Finally, the small-size testing apparatus 10 emits a signal indicating that payment for the consumable item will be delivered to the service provider 3 (S20), and when the payment is received the provider server 30 of the service provider 3 emits a signal (S21).

Thus, by establishing a POC testing service having a structure that centers on the small-size testing apparatus 10 according to this example, it is possible for a subject to receive at the local infirmary 1 the level of testing and treatment that is conventionally available only at the large hospital 2 without the subject having to visit the large hospital 2 that may be located far away. Further, by building up a gene database, it is possible to prescribe medicines having fewer side effects that are suited to the genetic make-up of a subject.

For the infirmary 1, by introducing (by purchasing or renting from the service provider 3) the small-size testing apparatus 10, testing that is on a par with that of the large hospital 2 can be conducted simply and quickly, enabling the infirmary 1 to acquire clients by offering medical examinations of adult diseases such as cancer or diabetes. Cooperation with the large hospital 2 also involves the advantage of enhancing the accuracy of treatment. Further, since the system is one whereby only the quantity of assay chips, the consumable item, that has been consumed is replenished, testing can be conducted without having to maintain unnecessary stocks and without the need to devote labor to maintaining the activity of a reagent.

For the large hospital 2, by imparting advice with respect to a test results or an added value to consumable item information, the large hospital 2 can receive an information provision fee from the infirmary 1 or the service provider 3, and can also obtain an asset in the form of accumulation of clinical data. Further, since a subject may visit the large hospital 2 following an introduction by the infirmary 1 if the symptoms of the subject deteriorate, the large hospital 2 can acquire potential clients.

For the service provider 3, since it is only necessary for the service provider 3 to insert a reagent in an assay chip in accordance with the assay chip consumption situation of a user (in this example, the infirmary 1), the system has the advantage that it eliminates the need to maintain unnecessary stocks of assay chips. Also, since consumable item information is obtained through the large hospital 2, it is possible optimize a line for production and formulation of a reagent that is included in an assay chip in accordance with the prevalence of epidemic diseases, enabling the provision of a more precise form of testing.

As the data employed as the aforementioned test results at the aforementioned infirmary 1, preferably a base sequence of a predetermined length (a sequence that is long to a certain extent) is used. Thus, since the data includes a plurality of information it is possible to implement testing of a higher accuracy.

With respect to the data accumulated in the memory part 220 of the large hospital 2, the population data that is compared with a transmitted test results may be a genetic sequence of a specific location from genetic information of a large number of people. By comparing this with a test results, differences upon comparison with the population data can be observed. As a result, susceptibility to the specific disease that is the object of examination or the level of incidence can be estimated. Alternatively, if a difference is within a permitted range, the difference can be diagnosed as being within the range of a permissive condition.

More specifically, a genetic assay value (specified location: one corresponding to a disease) as a test results is compared with the sequence of a specified location (one involving a high probability of the specified disease) stored in a database. Diagnosis is then conducted based on an assay value of a location having a difference with respect to a mean value, majority value and selected value that are extracted from population data, from among assay values of a plurality of locations. For example, it may be diagnosed that when these differences are large the probability of contracting a disease is low, and when the differences are small the probability of contracting a disease is high.

For reactivity such as an allergy to a specific substance, a genetic assay value is also compared with a sequence of a specific location (one involving a high probability of allergy or drug effect or the like). It may be diagnosed that when a difference is large the probability of reactivity such as an allergy is small, and when a difference is small the probability of an allergy is high.

Further, utilizing these genetic assay values as population data of a database allows scope for the comparison values to change, and thus testing of a higher accuracy can be performed.

It is therefore possible to compare an assay value with given comparison values (majority value, mean value, selected value) based on updated population data to enable diagnosis of the probability of reactivity with respect to a specific disease or specific target object based on the level of difference. Accurate diagnosis of a genetically attributable disease can also be easily conducted (even at an infirmary).

According to this system, it is possible to perform high accuracy diagnosis while preventing leakage of personal information. A highly accurate database can also be constructed.

In a case where a service provider maintains a population database of test results and performs the updating operations, data containing a name ID or assay value is transmitted from an infirmary to a large hospital, and the large hospital transmits a reply together with the aforementioned comment to the infirmary. In this case, the assay value (having deleted data concerning a name) can also be transmitted to the service provider so that the service provider can update the population database.

Subsequently, the service provider transmits the updated population data to the large hospital. An assay value from an infirmary may be compared with the updated population data and diagnosis performed, and the comparison then reflected in the result transmitted to the infirmary.

A service provider may be connected to a plurality of large hospitals through a network, to obtain information for use as population data from a plurality of large hospitals. A problem concerning privacy is avoided since data regarding the name of a data provider is deleted. A data provider can receive a medical examination and diagnosis based on highly accurate population data, and thus the quality of medical treatment can be enhanced. A large hospital can conduct a medical examination based on highly accurate population data, and can thereby improve the quality of service provided.

As a different form of the above system, information containing an assay value and name ID is transmitted from an infirmary to a service provider, and information containing the name ID, assay value and updated population data is transmitted to a large hospital. The large hospital may then compare the assay value from the infirmary with the updated population data to perform diagnosis, and transmit the outcome to the infirmary.

In this case, although the name ID is communicated to the service provider, the flow of operation is simple, and fast processing and an effective response can be achieved. Data from an updated database can be sent efficiently to a large hospital together with an assay value, enabling diagnosis based on an up-to-date database.

Alternatively, an ID for transmission that corresponds to a name ID can be created at an infirmary, the infirmary can send the ID for transmission and an assay value to a service provider, and the ID for transmission, assay value and updated population data can then be transmitted from the service provider to a large hospital. As another alternative, data showing the relationship between an ID for transmission and a name ID may be transmitted from an infirmary to a large hospital. At the large hospital, an assay value from an infirmary is compared with updated population data to perform diagnosis, and the result is transmitted to the infirmary that is identified from the ID for transmission and name ID. Thus, it is possible to increase security while obtaining the above described two operational effects.

Preferably, the above described assay chip is used according to a process having the steps of:

providing an assay chip having a reaction cell in which a specimen that is obtained from a living organism is introduced, a reagent reservoir in which is stored a reagent to be supplied to the above described reaction cell, a reagent nozzle connecting the above described reaction cell with the above described reagent reservoir and constituting a flow channel that allows the above described reagent stored in the above described reagent reservoir to flow into the above described reaction cell;

cooling the above described reagent of the reagent reservoir of the above described provided assay chip to solidify the reagent;

conveying the above described assay chip that stores the above described solidified reagent;

heating the above described conveyed assay chip to liquefy the above described reagent;

mixing the above described reagent with a specimen obtained from a living organism in the above described reaction cell; and detecting a reaction generated by the above described mixing.

According to this example, there can be provided a distributed testing system that can enhance the accuracy of testing and lessen the physical burden on a subject by communicating test data of a subject between hospitals, and a testing apparatus for actualizing the same.

Example 2 is described hereunder.

Figure 9:
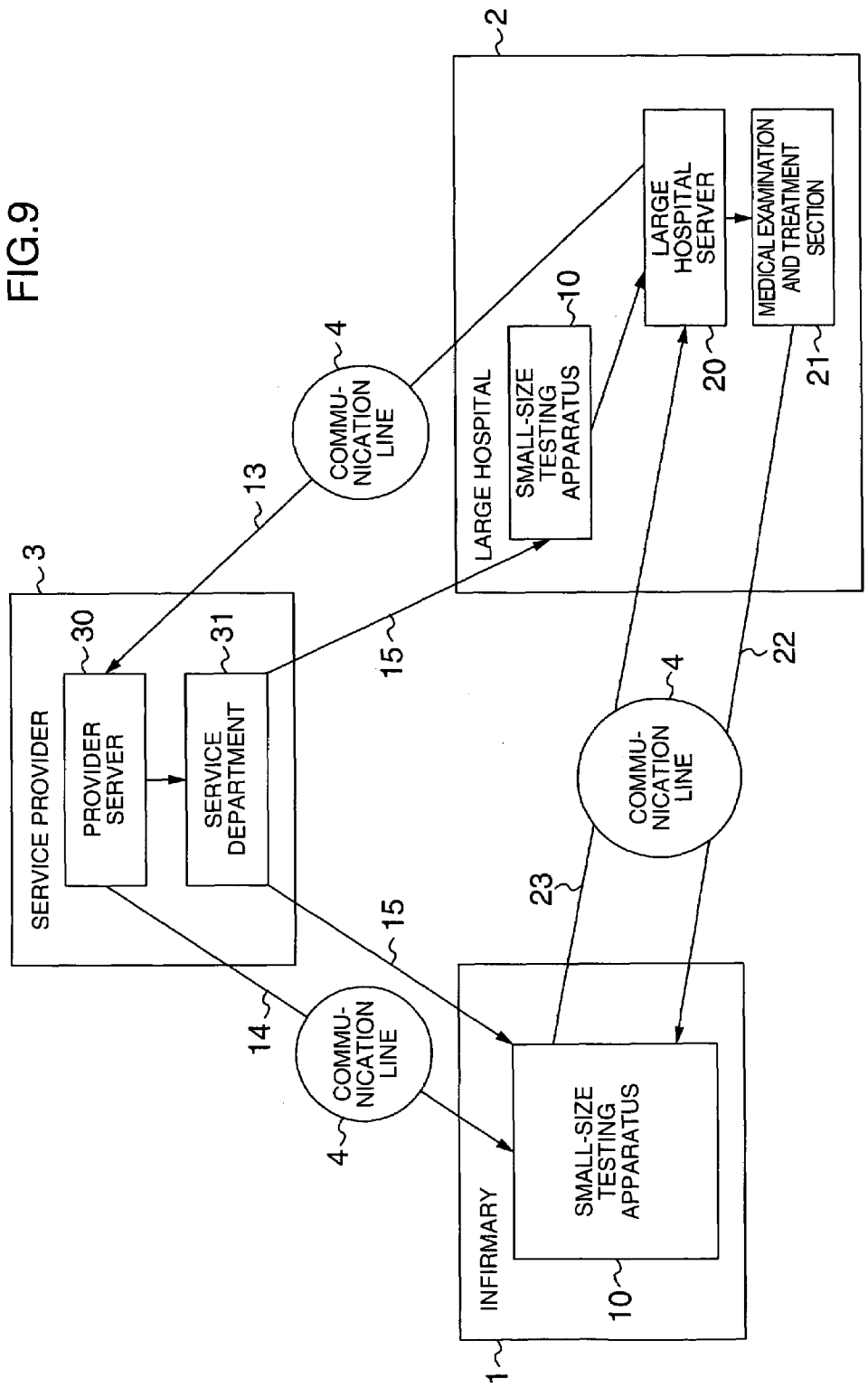
FIG. 9 is a schematic diagram of the overall testing system according to Example 2.

Example 2 may take fundamentally the same from as Example 1. In Example 1 the subject goes to the local infirmary 1 to undergo a test, and also receives treatment in the infirmary 1 according to the test results. In this example, however, referring to FIG. 9, a case is described in which the subject first undergoes a test at the large hospital 2, and thereafter testing and treatment are conducted at the local infirmary 1 in accordance with the wishes of the subject. Herein, components that are the same as those in Example 1 are given the same symbol, and a detailed explanation relating thereto is omitted.

(POC Testing Service System)

In this example, similarly to Example 1, a configuration is employed in which a large hospital 2 having an anamnestic clinical database and a gene database that is updated daily, an infirmary 1 that does not possess a large-size testing apparatus, and a service provider 3 that provides a small-size testing apparatus 10 and disposable assay chips can be connected through communication lines 4.

A laboratory technician of the large hospital 2 conducts a test of a subject using the small-size testing apparatus 10, and transmits test information (test results, ID of subject, consumable item information) to the large hospital server 20 using an information transmission function within the small-size testing apparatus 10. The test information is edited by the large hospital server 20 and that edited test information is sent to a medical examination and treatment section 21 together with data extracted from the large hospital server 20. A physician of the medical examination and treatment section 21 examines the test information referring to the anamnestic clinical database and the gene database that is updated daily, appends a note outlining the future treatment policy to the test information, and transmits the above described test information 22 to the small-size testing apparatus 10 of an infirmary 1 that is chosen by the subject from among various infirmaries 1 that have entered a service agreement (with the premise that they possess small-size testing apparatus 10) with the large hospital 2. Thus, the process described below may be conducted when the subject visits the infirmary.

When the subject visits the infirmary 1, the infirmary 1 proceeds with testing and treatment based on the above described test information 22. Then, every time a predetermined period is reached (for example, after every three visits by the subject to the infirmary), information 23 regarding progress in testing and treatment is transmitted to the large hospital server 20 of the large hospital 2 from the small-size testing apparatus 10. The test information 23 of the subject is recorded in a database of a memory part 220 of the large hospital server 20, and is then transmitted to the medical examination and treatment section 21 of the large hospital 2 every time a predetermined period is reached. Thereupon, appropriate treatment advice is transmitted to the small-size testing apparatus 10 of the infirmary 1 from the medical examination and treatment section 21. The infirmary 1 pays an advice provision fee to the large hospital 2.

A method of sending and receiving consumable item information between the service provider 3 and the large hospital 2 or the infirmary 1 is the same as described in Example 1.

(Flow of POC Testing)

Figure 10:
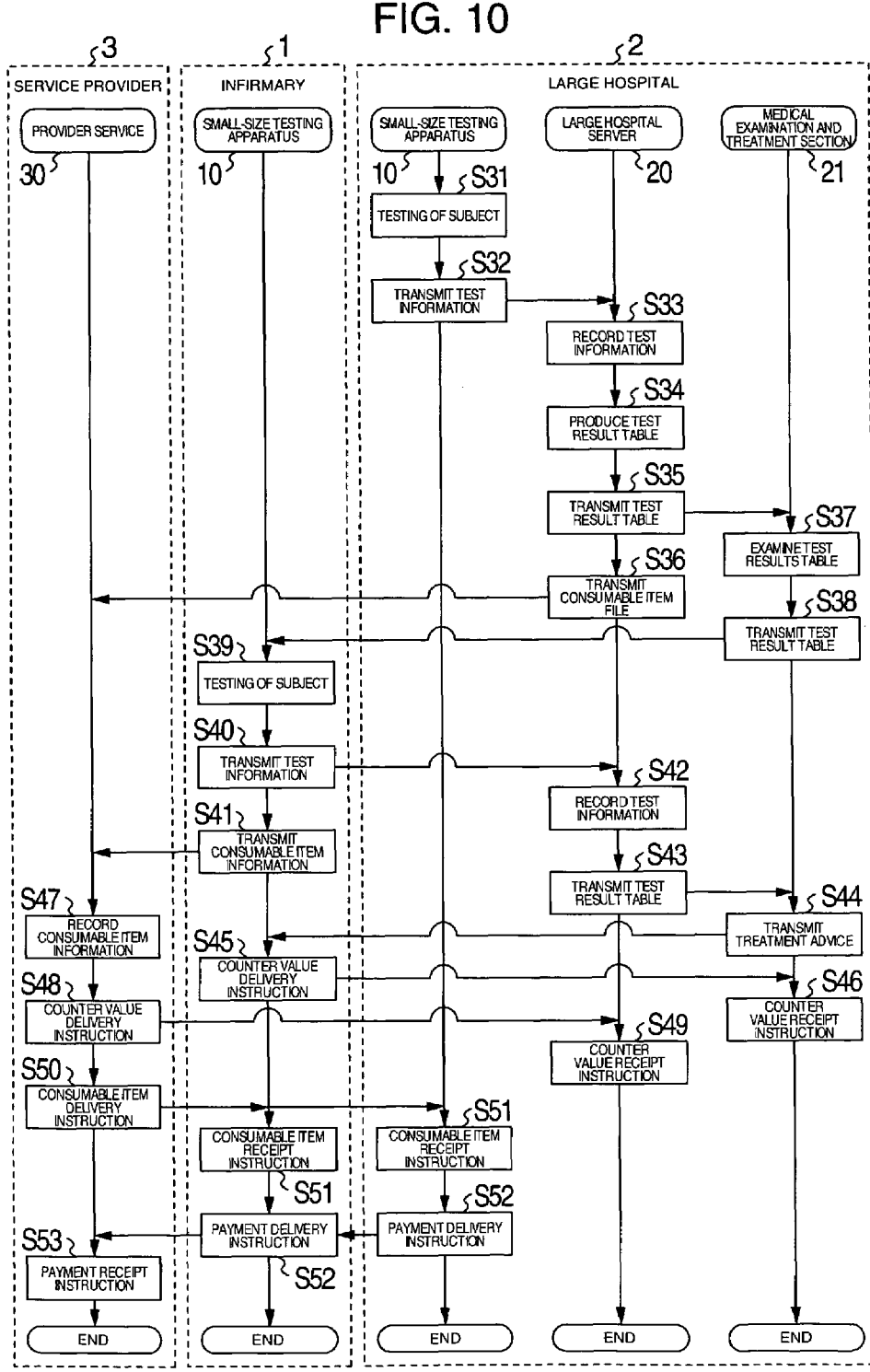
FIG. 10 is a flowchart showing the flow of a testing system according to Example 2.

FIG. 10 shows the flow of POC testing conducted when a subject first undergoes testing at the large hospital 2 and thereafter is subject to testing and treatment at a local infirmary 1 that is chosen by the subject. Herein, it is assumed that the infirmary 1, the large hospital 2 and the service provider 3 have entered into a service agreement prior to the start of operations.

First, the ID of the subject is registered in the small-size testing apparatus 10 in the large hospital 2, and then the subject undergoes a test for about 15 to 30 minutes using the small-size testing apparatus 10 (S31). The test information (test results, subject ID, consumable item information) is then transmitted to the server of the large hospital 2 (S32).

The transmitted test information is received by the server of the large hospital 2, and recorded in a database of the memory part 220 by an information recording means 231 of an information control part 230 (S33). Next, updated data of a registration database 222 is extracted by a database extraction means 232, and a test results table in which updated data of the registration database 222 is added to a test results of the subject is produced (S34). The test results table is then transmitted to the medical examination and treatment section 21 (S35). Further, a consumable item file 13 in which updated information of the registration database 222 is added to consumable item information is produced by a consumable item file production means 234, and the consumable item file 13 is transmitted to the provider server 30 of the service provider 3 (S36).

The test results table transmitted from the server of the large hospital 2 is examined in the medical examination and treatment section 21 (S37). A physician of the medical examination and treatment section 21 appends a note outlining future treatment policy to the test results table, and transmits the above described test results table to the small-size testing apparatus 10 of an infirmary 1 that is chosen by the subject from among various infirmaries 1 that have entered a service agreement with the large hospital 2 (S38).

If the infirmary 1 has a test results produced by the above described process when the subject visits the infirmary 1, the infirmary 1 conducts testing and treatment based on the above described test results table (S39). Each time a predetermined period is reached, or as required, the testing and treatment progress is transmitted to the large hospital server 20 of the large hospital 2 from the small-size testing apparatus 10 (S40). Further, information regarding the consumption of consumable items is transmitted to the provider server 30 of the service provider 3 (S41).

The test information of the subject transmitted from the infirmary 1 is recorded in a database of the memory part 220 of the server of the large hospital 2 (S42). Thereupon, a new test results table is created by the test results production means 233 of the information control part 230, and is transmitted to the medical examination and treatment section 21 of the large hospital 2 every time a predetermined period is reached (S43).

The test results table is examined in the medical examination and treatment section 21, and treatment advice is transmitted to the small-size testing apparatus 10 of the relevant infirmary 1 (S44).

The small-size testing apparatus 10 emits a signal indicating that value with respect to the treatment advice provided will be delivered to the large hospital 2 (S45). When the medical examination and treatment section 21 of the large hospital 2 receives the value it emits a signal (S46).

In the service provider 3, consumable item information that was transmitted from the small-size testing apparatus 10 or the large hospital server 20 is recorded in a database of the memory part 250 by the information recording means 261 of the information control part 260 (S47). Next, a signal is emitted indicating that value with respect to the consumable item file 13 that was transmitted from the large hospital server 20 will be sent to the large hospital 2 (S48). When the value is received, the large hospital server 20 of the large hospital 2 emits a signal (S49). In the service provider 3, a signal is then emitted indicating that consumable items will be delivered to the infirmary 1 and the large hospital 2 (S50). When the consumable items are received, a small-size testing apparatus 10 of the infirmary 1 and the large hospital 2 emits a signal (S51). Finally, the small-size testing apparatuses 10 emit a signal indicating that payment for the consumable items will be delivered to the service provider 3 (S52), and when the payment is received the provider server 30 of the service provider 3 emits a signal (S53).

In comparison to Example 1, the subject can obtain the feeling of satisfaction of having undergone a test at the large hospital 2. For the large hospital 2, it is possible to entrust care of a subject who, despite requiring long-term care, suffers from only mild symptoms, such as an allergy ailment, to the infirmary 1. Further, it is also possible to adopt a form whereby a patient is allowed to leave hospital at an early stage after surgery to have the infirmary 1 monitor the postoperative progress. Thus, chronic bed shortages can be eliminated. For the infirmary 1, they can anticipate an additional increase in clients, and for the service provider 3 the system offers the advantage that small-size testing apparatuses 10 are distributed in the large hospital 2.

Example 3 is described hereunder.

Figure 11:
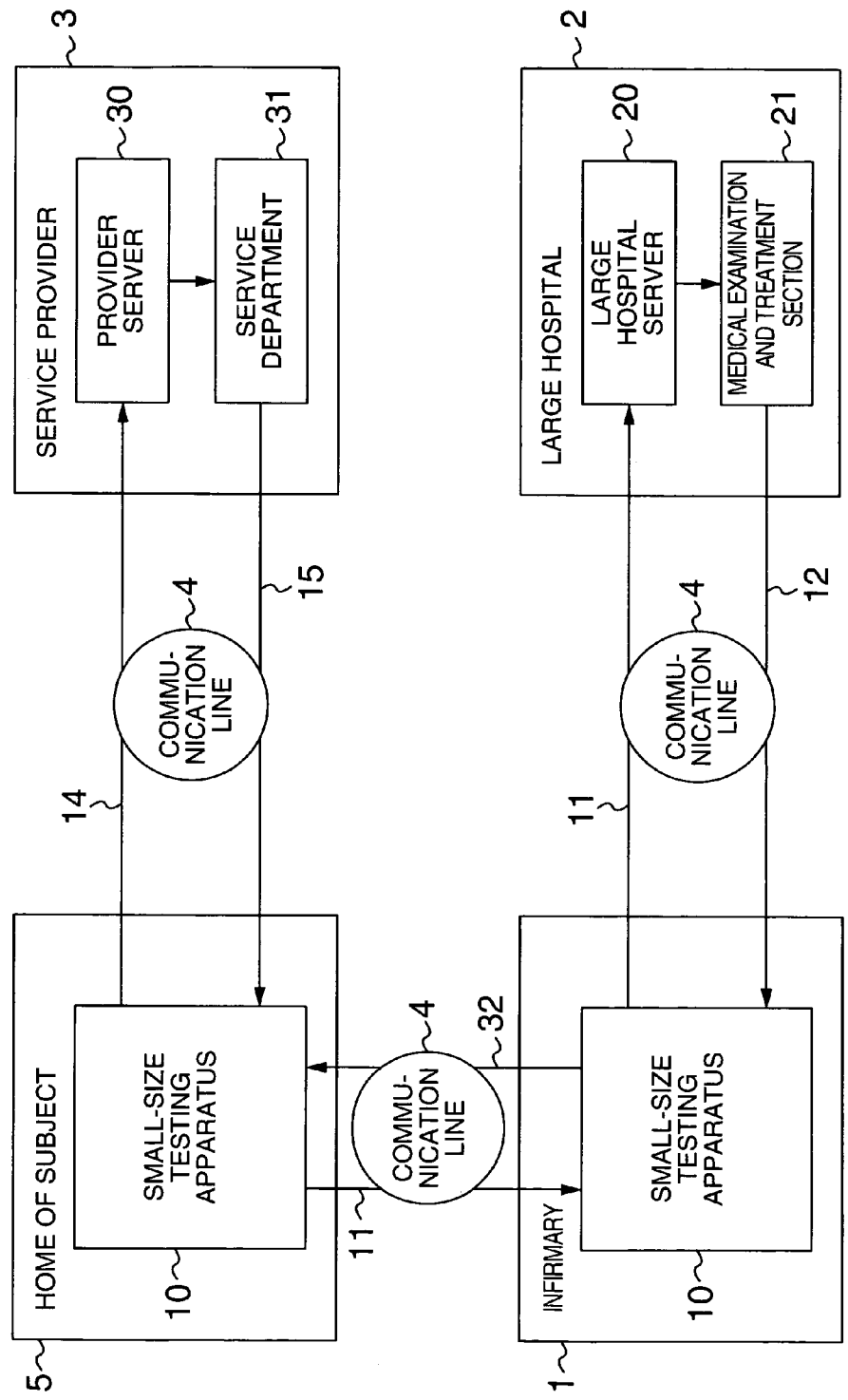
FIG. 11 is a schematic diagram of the overall testing system according to Example 3.

Fundamentally, Example 3 can comprise the same form as Example 1, however, in this example, using a small-size testing apparatus 10 provided in the home of a subject, the subject himself conducts a test. The test results are then transmitted to a local infirmary 1 and treatment advice is received. This example of treatment at home that centers on the small-size testing apparatus 10 is described using FIG. 11.

(POC Testing Service System)

In this example, a configuration is employed in which a home of the subject 5 in which a small-size testing apparatus 10 is provided, a local infirmary 1 of the subject, a large hospital 2 having an anamnestic clinical database and a gene database that is updated daily, and a service provider 3 that provides a small-size testing apparatus 10 and disposable assay chips can be connected through communication lines 4.

The subject disposes the small-size testing apparatus 10 that was lent from the service provider 3 in the home 5, and conducts testing of his own urine and blood using the small-size testing apparatus 10. Then, using an information transmission function within the small-size testing apparatus 10, the subject transmits test information (test results, ID of subject) 11 to a small-size testing apparatus 10 of the infirmary 1. Also, by transmitting consumable item information 14 to the service provider 3, the quantity of assay chips 15 consumed is replenished by the service provider 3. The details are the same as those in Example 1.

In the infirmary 1, based on the test information 11 received by the small-size testing apparatus 10, health advice 32 such as a menu for meals is transmitted to the home of the subject 5. In addition, in order to provide more detailed health advice based on genetic information of the subject, the test information 11 is transmitted from the small-size testing apparatus 10 of the infirmary 1 to the large hospital server 20 of the large hospital 2.

In the large hospital 2, the large hospital server 20 edits the test information 11, and the edited test information is sent to a medical examination and treatment section 21 together with data extracted from the large hospital server 20. A physician of the medical examination and treatment section 21 examines the test information based on an anamnestic clinical database and a gene database that is updated daily, and transmits a treatment advice 12 to the small-size testing apparatus 10.

Based on this treatment advice 12, the infirmary 1 can transmit to the subject health advice 32 of a higher accuracy that is suited to the individual constitution of the subject.

The subject can ask questions regarding the transmitted health advice or make an appointment for a medical examination or the like from the small-size testing apparatus 10 of the home 5.

(Flow of POC Testing)

Figure 12:
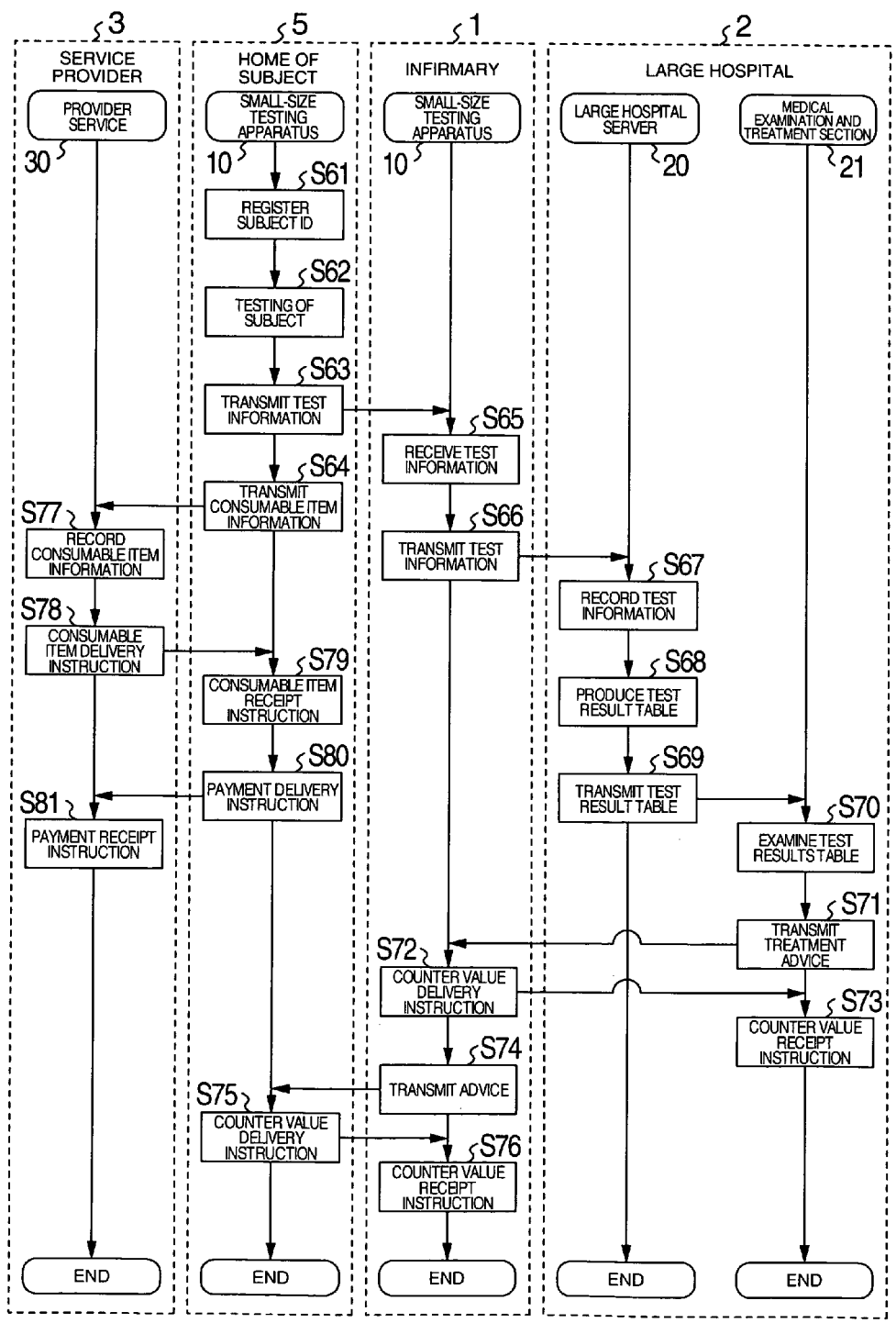
FIG. 12 is a flowchart showing the flow of a testing system according to Example 3.

FIG. 12 shows the flow of POC testing in the case where a subject first undergoes a test at home, and the subsequent testing and treatment is conducted at a local infirmary 1 that is chosen by the subject. Herein, it is assumed that the subject, the infirmary 1, the large hospital 2 and the service provider 3 have entered into a service agreement prior to the start of operations.

Thus, it is possible for test information acquired by a test conducted using a testing apparatus at the home of the subject to be transmitted from the home of the subject to a medical facility through a communication line.

First, at the home of the subject 5, the subject registers his own ID in the small-size testing apparatus 10 (S61), and conducts a self-test for about 15 to 30 minutes using the small-size testing apparatus 10 (S62). Then the subject transmits the test information (test results, ID of subject) to a small-size testing apparatus 10 of the infirmary 1 (S63). The subject also transmits consumable item information to a provider server 30 of the service provider 3 (S64).

The transmitted test information is received by the small-size testing apparatus 10 of the infirmary 1 (S65). While it is also possible for a physician of the infirmary 1 to promptly send a reply containing health advice based on this test information to the home of the subject 5, in this example, in order to provide health advice of a higher accuracy that is suited to the individual constitution of the subject, the infirmary 1 transmits the above described test information from the small-size testing apparatus 10 to a large hospital server 20 of the large hospital 2 (S66).

At the large hospital server 20, the test information is recorded in a database of a memory part 220 by an information recording means 231 of an information control part 230 (S67). Next, updated data of a registration database 222 is extracted by a database extraction means 232, and a test results table is produced in which the updated data of the registration database 222 is added to the test results of the subject (S68). The test results table is then transmitted to a medical examination and treatment section 21 (S69). In the medical examination and treatment section 21, the test results table transmitted from the large hospital server 20 is examined (S70). Treatment advice is then transmitted to the small-size testing apparatus 10 of the infirmary 1 (S71).

The infirmary 1 emits a signal indicating that value with respect to the treatment advice provided will be delivered to the large hospital 2 (S72). When the medical examination and treatment section 21 of the large hospital 2 receives the value it emits a signal (S73). Based on the above described treatment advice, the infirmary 1 transmits health advice of a higher accuracy to the small-size testing apparatus 10 in the home of the subject 5 (S74). The small-size testing apparatus 10 then emits a signal indicating that value for the health advice provided will be delivered to the infirmary 1 (S75), and when the payment is received the small-size testing apparatus 10 of the infirmary 1 emits a signal (S76).

In the service provider 3, consumable item information that was transmitted from the small-size testing apparatus 10 in the home of the subject 5 is recorded in a database of the memory part 250 by the information recording means 261 of the information control part 260 (S77). Next, a signal is emitted indicating that a consumable item will be delivered to the home of the subject 5 (S78). When the consumable item is received, the small-size testing apparatus 10 in the home of the subject 5 emits a signal (S79). Finally, the small-size testing apparatus 10 emits a signal indicating that a payment for the consumable item will be delivered to the service provider 3 (S80), and when the payment is received the provider server 30 of the service provider 3 emits a signal (S81).

Thus, simple and convenient testing can be conducted using a disposable assay chip, and by providing a small-size testing apparatus equipped with a function for transmission and reception of information at the site of home medical care the physical and economic burden on a subject is lessened and a highly accurate medical treatment service that is adopted to the individual constitution of the subject is realized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A distributed testing apparatus that is configured so as to be connectable to a network system to which is connected a host testing apparatus that comprises a host receiver part that receives information comprising test results information and a specimen ID that corresponds to a specimen, a communication part that communicates with a genetic information database, a comparing part that reads out from the genetic information database genetic information that corresponds with the test results information and compares the information, a host transmission part that transmits the comparison information, and a specimen database that stores the test results information corresponding to the specimen ID, wherein the distributed testing apparatus has a testing part that assays genetic information of the specimen, a transmission part that transmits test results information obtained by the testing part and the specimen ID to the host testing apparatus through the network, a receiver part that receives from the network assessment information that was processed by the host testing apparatus on the basis of the transmitted test results information, and an output part that outputs the received information.

2. The distributed testing apparatus according to claim 1, wherein the network is connected to a service provider, and the distributed testing apparatus has: an assay chip installation part into which is installed an assay chip having a reaction cell into which a target specimen obtained from a living organism can be introduced, a reagent reservoir in which a reagent to be supplied to the reaction cell is stored, and a reagent nozzle that connects the reaction cell and the reagent reservoir; a feeding mechanism that supplies to the reagent reservoir of the assay chip, fluid that causes the reagent of the reagent reservoir to be discharged to the reagent nozzle; and a detection part that detects a reaction in the reaction cell; and wherein in correspondence with transmission of the test results information to the host testing apparatus, information regarding consumption of the assay chip is transmitted to the service provider.

3. The distributed testing apparatus according to claim 1, wherein the genetic information database is updated on the basis of the test results information.

4. The distributed testing apparatus according to claim 1, wherein a plurality of facilities are connected to the network, and the distributed testing apparatus transmits to the host testing apparatus institutional information including the test results information and the information processed by the host testing apparatus.

5. The distributed testing apparatus according to claim 1, wherein the receiver part receives from the host testing apparatus assessment information that corresponds to the transmitted test results information as well as test results information of the specimen that was stored in the specimen database.

6. A distributed test server configured to be connectable to a network system to which is connected a host test server that comprises a host receiver part that receives test results information, a communication part that communicates with a genetic information database, a comparing part that reads out from the genetic information database genetic information that corresponds with the test results information and compares the information, and a host transmission part that transmits the comparison result, wherein the distributed test server has a test information input part to which is input test results information from a testing part that assays genetic information of a specimen, a memory part that stores a specimen ID that corresponds to a specimen, a first communication part that communicates with a transmission part that transmits the test results information and the ID to the host facility through a network, a receiver part that receives from the network assessment information from the host test apparatus that corresponds to the transmitted test results information, a recording part that records the received information, and a second communication part that communicates with an output part that outputs the received information.

7. A host testing apparatus comprising a connection part that connects to a network system to which is connected a distributed testing apparatus that comprises: an assay chip installation part into which is installed an assay chip having a reaction cell into which a target specimen can be introduced; a testing part that assays genetic information of a specimen in the reaction cell; and a transmission part that transmits to the host facility through a network test results information obtained by the testing part and a specimen ID that corresponds to the specimen; wherein the host testing apparatus comprises a host receiver part that receives the test results information from the distributed testing apparatus, a connection part that connects to a genetic information database, a comparing part that reads out from the genetic information database genetic information that corresponds with the test results information and compares the information, a host transmission part that transmits the comparison result through the network to the distributed testing apparatus, and a specimen database that stores the test results information that corresponds to the subject ID.

8. The host testing apparatus according to claim 7, wherein the test results includes genetic information of the specimens at a plurality of genetic locations, and genetic sequences of the test results are compared with genetic sequences for the locations of interest that are stored in the genetic information database.

9. The host testing apparatus according to claim 7, wherein the network is connected to a service provider, the host receiver part receives the test results information, the a specimen ID, the test information and information concerning the consumed assay chip that is transmitted from the distributed testing apparatus, and the host transmission part transmits the information received by the host testing apparatus to the service provider, and wherein the host testing apparatus comprises a personal information control part that deletes at least ID information of the specimen during a period before the received information is transmitted to the service provider.

10. The host testing apparatus according to claim 7, wherein the host testing apparatus has an input part for entering a comment based on the comparison result, and the host transmission part transmits the comparison result and the entered comment to the distributed testing apparatus.

11. The host testing apparatus according to claim 7, wherein, when the test results information received by the host receiver part includes destination information that has selected a destination for the result processed by the host testing apparatus, the host testing apparatus transmits the comparison result to the selected destination.

12. A host test server that comprises a connection part that connects to a network system to which can communicate a distributed test server that comprises an assay chip installation part into which is installed an assay chip having a reaction cell into which a specimen can be introduced; an input part that inputs test information from a testing apparatus comprising a testing part that assays genetic information of the specimen in the reaction cell; a first recording part that records the test information; and a second recording part that records a specimen ID that corresponds to the specimen; wherein the host test server comprises a host receiver part that receives the test results information and the specimen ID that corresponds to the specimen from the distributed test server, a connection part that connects to a genetic information database, a comparing part that reads out from the genetic information database genetic information that corresponds with the test results information and compares the information, an input part for entering a comment corresponding to the comparison result, and a host transmission part that transmits the comparison result and the comment to the distributed test server.

* * * * *